United States Patent
Yamamoto

(10) Patent No.: US 6,688,661 B2
(45) Date of Patent: Feb. 10, 2004

(54) BUMPER BEAM

(75) Inventor: Toshiyuki Yamamoto, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/794,034

(22) Filed: Feb. 28, 2001

(65) Prior Publication Data
US 2001/0017473 A1 Aug. 30, 2001

(30) Foreign Application Priority Data
Feb. 28, 2000 (JP) ........................................ 2000-051265

(51) Int. Cl.$^7$ ................................................ B60R 19/02
(52) U.S. Cl. ........................ 293/102; 273/120; 273/154; 273/155
(58) Field of Search ................................. 293/102, 120, 293/121, 122, 154, 155, 133; 188/371, 377; 296/187.03, 187.09, 187.11

(56) References Cited

U.S. PATENT DOCUMENTS

| | | | | | |
|---|---|---|---|---|---|
| 1,364,878 | A | * | 1/1921 | Halladay | 293/155 |
| 2,954,256 | A | * | 9/1960 | Barenyi | 293/155 |
| 4,116,480 | A | * | 9/1978 | Crestetto | 293/102 |
| 4,397,490 | A | * | 8/1983 | Evans et al. | 293/120 |
| 4,482,180 | A | * | 11/1984 | Huber et al. | 293/120 |
| 4,504,534 | A | * | 3/1985 | Adachi et al. | 428/71 |
| 4,597,601 | A | * | 7/1986 | Manning | 293/122 |
| 4,652,032 | A | * | 3/1987 | Smith | 293/120 |
| 4,762,352 | A | * | 8/1988 | Enomoto | 293/120 |
| 4,940,270 | A | * | 7/1990 | Yamazaki et al. | 293/122 |
| 5,139,297 | A | * | 8/1992 | Carpenter et al. | 293/132 |
| 5,154,462 | A | * | 10/1992 | Carpenter | 293/120 |
| 5,314,229 | A | * | 5/1994 | Matuzawa et al. | 293/133 |
| 5,462,325 | A | * | 10/1995 | Masuda et al. | 293/102 |
| 5,498,045 | A | * | 3/1996 | Morgan et al. | 293/155 |
| 5,603,541 | A | * | 2/1997 | Wada et al. | 293/102 |
| 5,829,805 | A | * | 11/1998 | Watson | 293/155 |
| 6,179,355 | B1 | * | 1/2001 | Chou et al. | 293/120 |
| 6,308,999 | B1 | * | 10/2001 | Tan et al. | 293/120 |
| 6,325,431 | B1 | * | 12/2001 | Ito | 293/102 |
| 6,334,638 | B1 | * | 1/2002 | Yamamuro et al. | 293/154 |
| 6,361,092 | B1 | * | 3/2002 | Eagle et al. | 293/120 |
| 6,371,540 | B1 | * | 4/2002 | Campanella et al. | 293/102 |
| 2001/0054827 | A1 | * | 12/2001 | Sundgren et al. | 293/102 |
| 2002/0047281 | A1 | * | 4/2002 | Hartel et al. | 293/102 |
| 2003/0020291 | A1 | * | 1/2003 | Roussel et al. | 293/120 |

FOREIGN PATENT DOCUMENTS

| | | | | |
|---|---|---|---|---|
| DE | 3626150 | * | 2/1988 | 293/132 |
| JP | 0073343 | * | 4/1984 | 293/102 |
| JP | 2-120024 | * | 5/1990 | 293/102 |
| JP | 2267047 | * | 10/1990 | 293/120 |
| JP | 5-139224 | | 6/1993 | |
| JP | 6-255433 | | 9/1994 | |
| JP | 406305377 | * | 11/1994 | 293/120 |
| JP | 9-86309 | | 3/1997 | |
| JP | 11-78730 | | 3/1999 | |

* cited by examiner

Primary Examiner—D. Glenn Dayoan
Assistant Examiner—H. Gutman
(74) Attorney, Agent, or Firm—Smith, Gambrell & Russell, LLP

(57) ABSTRACT

An inexpensive, lightweight, safe bumper beam (10) has an optimum strength characteristic and is capable of effectively coping with all kinds of collisions including slight collisions and strong collisions. The bumper beam (10) is disposed on a front or rear end part of a vehicle. Joining parts of the bumper beam (10) are attached to stays (2a, 2b) attached to, for example, front end parts of longitudinal frames (1a, 1b) of a body of a vehicle so that the bumper beam (10) extends laterally. The bumper beam (10) includes a bumper beam body (3) extended laterally and having a closed section and a reinforcing beam (4) extended in and along the bumper beam body (3). The reinforcing beam (4) includes a lateral upper wall (4a), a lateral lower wall (4b) and a front wall (4c) formed integrally with the upper and the lower walls (4a, 4b) to receive a longitudinal shock exerted on the vehicle. Parts of the upper wall (4a) and the lower wall (4b) around joining parts attached to the end parts of the frames (1a, 1b) are inclined to the front wall (4c) to form inclined parts (5).

18 Claims, 7 Drawing Sheets

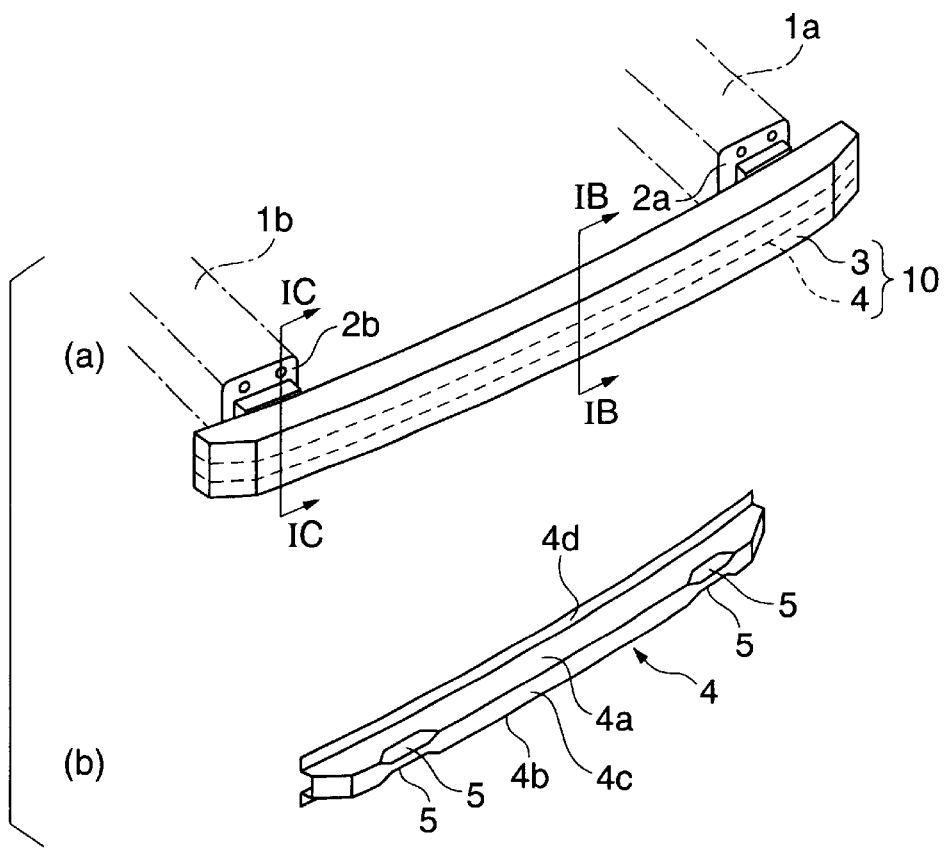
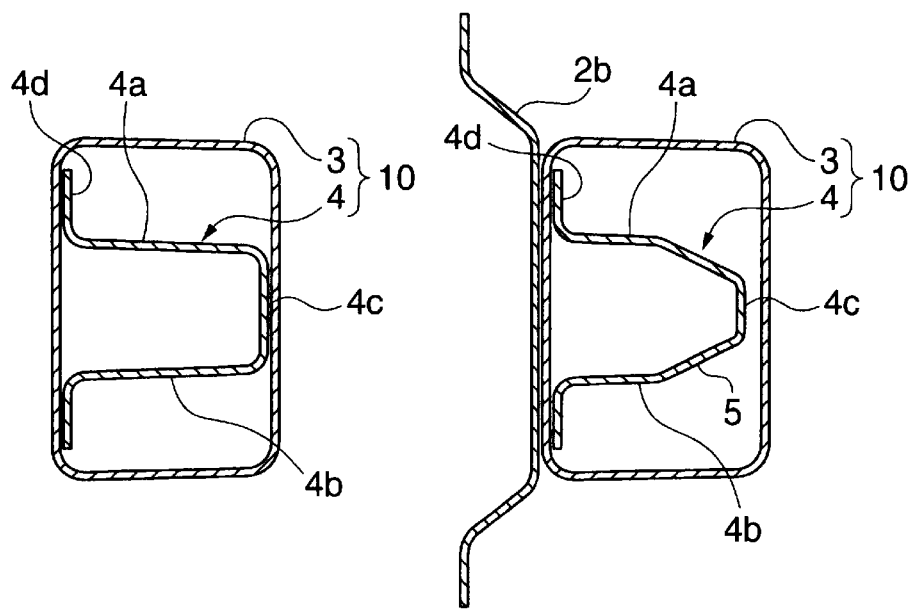
FIG. 1A
FIG. 1B  FIG. 1C

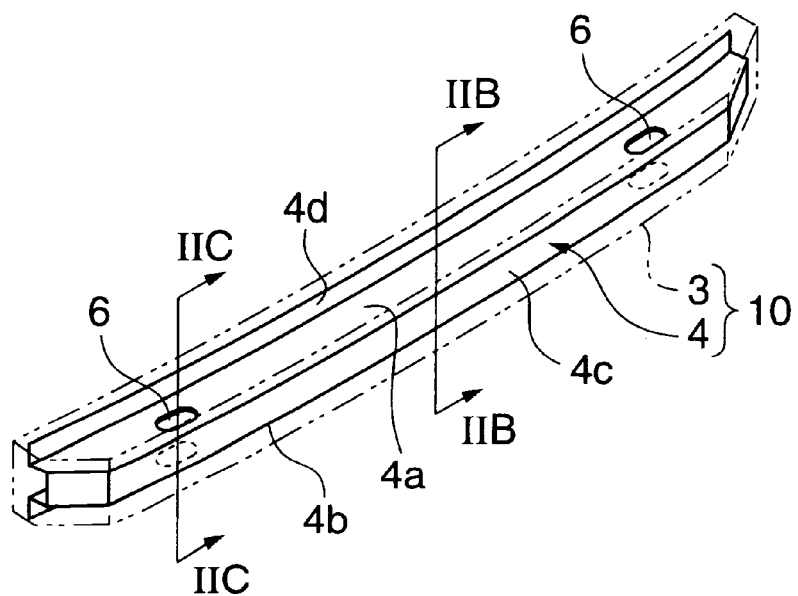
FIG. 2A
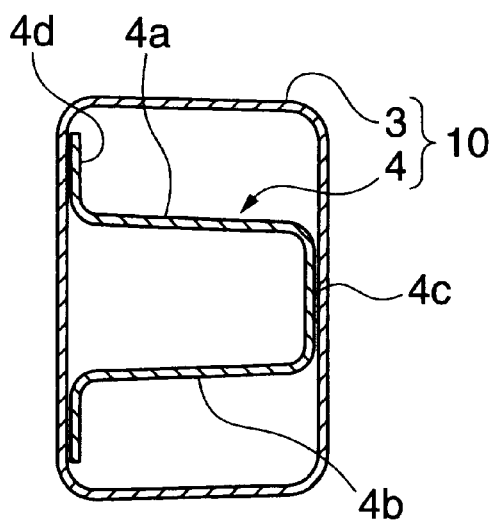 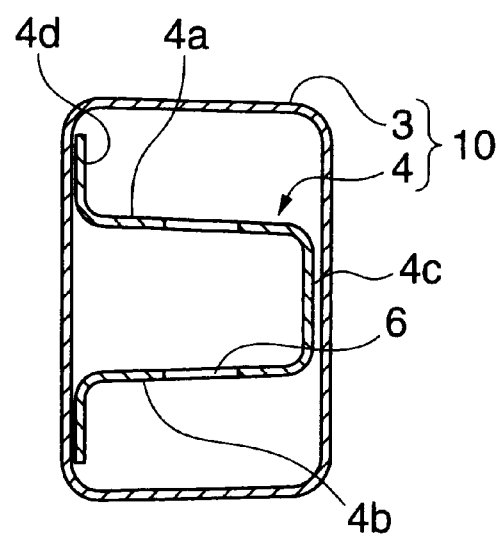
FIG. 2B  FIG. 2C

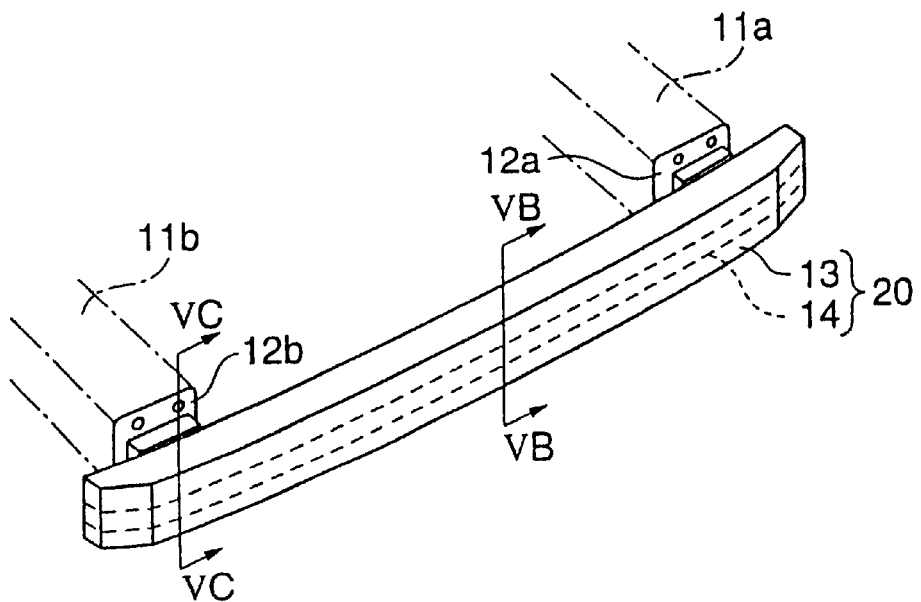
FIG. 5A
PRIOR ART
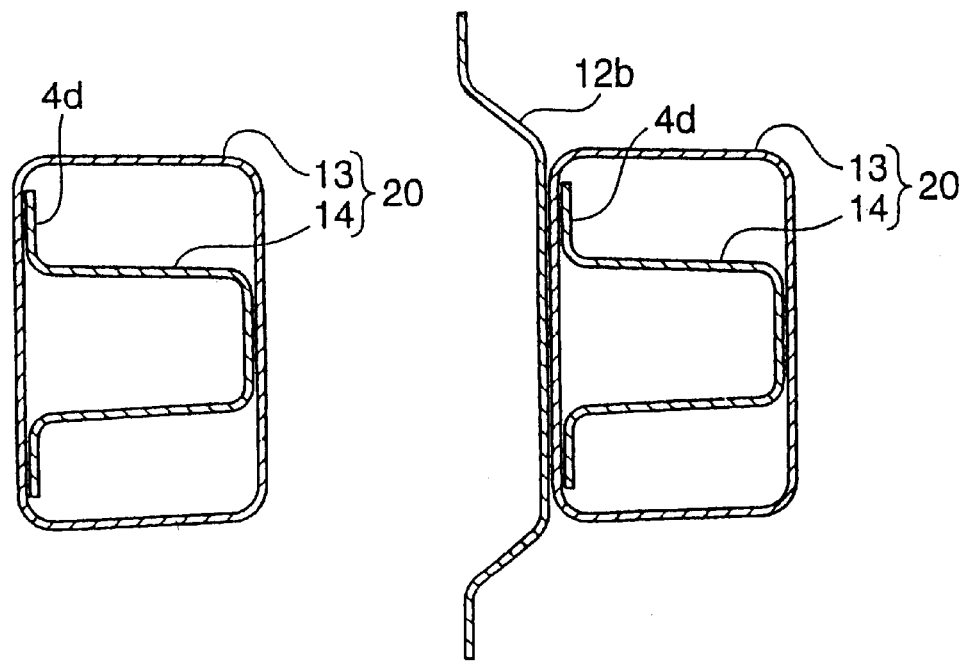
FIG. 5B
PRIOR ART
FIG. 5C
PRIOR ART

BUMPER BEAM

BACKGROUND OF THE INVENTION

1. Field of the Invention

The present invention relates to a bumper beam for holding a bumper, disposed in a front or rear end part of a vehicle.

2. Description of the Related Art

A bumper is attached to a front or rear end part of a vehicle to absorb shock and to protect the body of the vehicle and the passengers in longitudinal collision with another object. Generally, a bumper is attached to a bumper beam attached to free ends of longitudinal frame members (a pair of side frame members) so as to extend laterally. It is desirable, in view of protecting the body, that the bumper and the bumper beam are comparatively strongly built so that the same may not be damaged by a slight collision and do not need to be changed frequently.

FIGS. 5A, 5B and 5C show a typical, conventional bumper beam. As shown in FIG. 5A, a left stay 12a and a right stay 12b are attached to, for example, the front ends of a pair of longitudinal frames 11a and 11b, respectively, and a bumper beam 20 is attached to the stays 12a and 12b so as to extend laterally. The bumper beam 20 has a bumper beam body 13 having a closed sectional shape and a channel-shaped reinforcing beam 14 extended in the bumper beam body 13.

In the bumper beam 20, joining parts of the bumper beam body 13 associated with the front ends of the longitudinal frames 11a and 11b (FIG. 5C) and a middle part of the same (FIG. 5B) are substantially the same in shape, and joining parts of the reinforcing beam 14 associated with the front ends of the longitudinal frames 11a and 11b (FIG. 5C) and a middle part of the same (FIG. 5B) are substantially the same in shape.

Since the structural strength of joining parts of the bumper beam 20 that are attached to the front ends of the longitudinal frames 11a and 11b is the same as that of a middle part of the bumper beam 20, the bumper beam body 13 and the reinforcing beam 14 of the bumper beam 20 have high strength to withstand a strong shock that applies a compressive force exceeding a predetermined level on the bumper beam 20, such as a shock that is exerted on the bumper beam 20 by a high-speed collision, let alone a shock that is exerted on the bumper beam 20 by a slight collision. Consequently, the shock of collision is transmitted directly to the longitudinal frames 11a and 11b at a high-speed collision, and the longitudinal frames 11a and 11b are squeezed to absorb the shock.

However, it is effective in protecting the passengers to let not only the frame of the body but also the bumper yield effectively to absorb the shock of collision by the bumper at high-speed collisions.

There have been proposed various bumpers having bumper beams meeting such directly opposed characteristics necessary for effectively absorbing shocks at slight collisions and strong collisions. However, all those known bumper beams are complicated in structure, need a shock absorbing mechanism having members capable of moving for a long longitudinal stroke, are costly and/or affect styling adversely.

SUMMARY OF THE INVENTION

Accordingly, it is an object of the present invention to solve the problems in the aforesaid conventional bumper beams and to provide an inexpensive, lightweight, highly safe bumper beam having an optimum mechanical characteristic and capable of effectively coping with slight and strong collisions.

According to one aspect of the present invention, a bumper beam to be attached to a front or rear end part of a vehicle comprises a bumper beam body attached to end parts of longitudinal frames so as to extend laterally; and a reinforcing beam extended in the bumper beam along the same; wherein parts of at least either the bumper beam body or the reinforcing beam, around joining parts attached to the longitudinal frames have a strength lower than that of other parts of the bumper beam body or the reinforcing beam so that the joining parts may be deformed by a compressive force exceeding a predetermined level.

In the bumper beam according to the present invention, it is preferable that the bumper beam body or the reinforcing beam includes a lateral upper wall, a lateral lower wall and a front wall formed integrally with the upper and the lower wall to receive a longitudinal shock exerted on the vehicle, and parts of at least either the upper wall or the lower wall around the joining parts are inclined parts inclined to the front wall.

In the bumper beam according to the present invention, it is preferable that the bumper beam body or the reinforcing beam includes a lateral upper wall, a lateral lower wall, a front wall formed integrally with the upper and the lower wall to receive a longitudinal shock exerted on the vehicle, and openings are formed in parts of at least either the upper wall or the lower wall around the joining parts, respectively. Preferably, the openings are holes formed in the upper or the lower wall, or recesses formed in an edge of the upper or the lower wall, not connected to the front wall.

In the bumper beam according to the present invention, it is preferable that the bumper beam body or the reinforcing beam includes a lateral upper wall, a lateral lower wall and a front wall formed integrally with the upper and the lower wall to receive a longitudinal shock exerted on the vehicle, and inclined parts inclined to the front wall and openings are formed in parts of at least either the upper wall or the lower wall around the joining parts, respectively. Preferably, the openings are holes formed in the upper or the lower wall, or recesses formed in an edge of the upper or the lower wall, not connected to the front wall.

In the bumper beam according to the present invention, it is preferable that the parts of the front wall of the reinforcing beam around the joining parts are spaced from the bumper beam body.

According to the present invention, the strength of the joining parts of the bumper beam (a bumper beam body or a reinforcing beam) attached to the end parts of the longitudinal frames is lower than that of other parts of the bumper beam so that the joining parts may be deformed by a compressive force exceeding a predetermined level. Therefore, the bumper beam (the bumper beam body or the reinforcing beam) has a strength sufficient to withstand a compressive force below the predetermined level that is exerted thereto by a slight collision, the bumper beam is not damaged by such a low compressive force and hence the bumper beam does not need to be changed frequently. When a compressive force exceeding the predetermined level is exerted on the bumper beam by a high-speed collision, the joining parts of the bumper beam (the bumper beam body or the reinforcing beam) attached to the end parts of the frames buckle and collapse in an early stage of a high-speed collision to limit a maximum impact load to a low level and to absorb collision energy efficiently so that reduced collision energy may be exerted on the frames of the body of the vehicle and a reduced shock may be exerted on the passengers.

According to the present invention, the strength of the joining parts of the bumper beam body or the reinforcing beam, attached to the end parts of the frames can be reduced by forming inclined parts inclined to the front wall in parts of at least the upper or the lower wall of the bumper beam (the bumper beam body or the reinforcing beam). In this case, the distribution of strength on the bumper beam body or the reinforcing beam can be adjusted only through the variation of the sectional shape and the bumper beam body or the reinforcing beam can be easily manufactured without requiring boring or cutting work.

According to the present invention, the strength of the joining parts of at least either the upper or the lower wall of the bumper beam body or the reinforcing beam can be reduced by forming openings therein. In this case, the bumper beam body or the reinforcing beam can be formed in a simple sectional shape and can be easily manufactured. Particularly, when the openings (holes) are formed in the upper or the lower wall, the bumper beam body or the reinforcing beam can be easily manufactured by bending a plate even though boring work is necessary. When the openings (recesses) are formed by cutting parts of an edge of the upper or the lower wall, not connected to the front wall, the bumper beam body or the reinforcing beam can be easily manufactured by bending a plate even though cutting work is necessary. The cutting work for forming the recesses is simpler than the boring work.

The spacing of the parts of the front wall of the reinforcing beam around the joining parts from the bumper beam body promotes the initial collapsing of the bumper beam body.

According to the present invention, in the bumper beam having the bumper beam body and the reinforcing beam, the shape of the bumper beam body can be simplified without requiring any change in the shape of the bumper beam body only by adjusting the distribution of strength on the reinforcing beam for collapsing mode adjustment.

According to another aspect of the present invention, a bumper beam disposed on a front or rear end part of a vehicle, having joining parts attached to end parts of longitudinal frames, and extend laterally; wherein the joining parts have a strength lower than that of other parts of the bumper beam so that the joining parts may be deformed by a compressive force exceeding a predetermined level.

BRIEF DESCRIPTION OF THE DRAWINGS

Bumper beams in preferred embodiments of the present invention will be described with reference to the accompanying drawings.

In the drawings,

FIGS. 1A, 1B and 1C are views of a bumper beam in a first embodiment of the present invention, in which FIG. 1A is a perspective view of the bumper beam attached to the frames of the body of a vehicle, and a reinforcing beam, FIG. 1B is a sectional view taken on line IB—IB in FIG. 1A and FIG. 1C is a sectional view taken on line IC—IC in FIG. 1A;

FIGS. 2A, 2B and 2C are views of a bumper beam in a second embodiment of the present invention, in which FIG. 2A is a perspective view of a reinforcing beam, FIG. 2B is a sectional view taken on line IIB—IIB in FIG. 2A and FIG. 2C is a sectional view taken on line IIC—IIC in FIG. 2A;

FIGS. 3A, 3B and 3C are views of a bumper beam in a third embodiment of the present invention, in which FIG. 3A is a perspective view of a reinforcing beam, FIG. 3B is a sectional view taken on line IIIB—IIIB in FIG. 3A and FIG. 3C is a sectional view taken on line IIIC—IIIC in FIG. 3A;

FIGS. 4A, 4B and 4C are views of a bumper beam in a fourth embodiment of the present invention, in which FIG. 4A is a perspective view of a reinforcing beam, FIG. 4B is a sectional view taken on line IVB—IVB in FIG. 4A and FIG. 4C is a sectional view taken on line IVC—IVC in FIG. 4A; and FIGS. 5A, 5B and 5C are views of a conventional bumper beam, in which FIG. 5A is a perspective view of the bumper beam attached to the frames of the body of a vehicle, FIG. 5B is a sectional view taken on line VB—VB in FIG. 5A and FIG. 5C is a sectional view taken on line VC—VC in FIG. 5A.

FIGS. 6A, 6B, 6C, and 6D are perspective views of the bumper beam body corresponding to each embodiment, and FIG. 6E is a sectional view of a bumper beam body corresponding to FIG. 2C.

DESCRIPTION OF THE PREFERRED EMBODIMENTS

First Embodiment

Figure 3A:
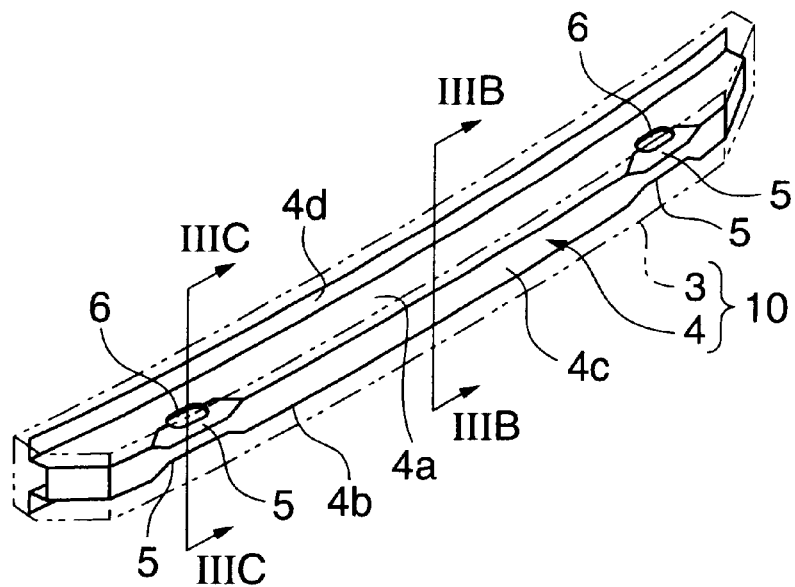

A bumper beam in a first embodiment according to the present invention will be described with reference to FIGS. 1A, 1B and 1C.

Referring to FIG. 1A($a$), a bumper beam 10 is disposed on a front or rear end part of a vehicle and is held by stays 2$a$ and 2$b$ attached to, for example, front end parts of a pair of longitudinal frames 1$a$ and 1$b$ of a body so as to extend laterally.

As shown in FIGS. 1A($a$), 1B and 1C, the bumper beam 10 includes a bumper beam body 3 having a closed sectional shape and a reinforcing beam 4 having a substantially U-shaped cross section. The bumper beam body 3 is extended laterally and the reinforcing beam 4 is extended in and along the bumper beam body 3.

As shown in FIG. 1A($b$), the reinforcing beam 4 has an upper wall 4$a$, a lower wall 4$b$ and a front wall 4$c$ formed integrally with the upper wall 4$a$ and the lower wall 4$b$. The front wall 4$c$ receives a longitudinal shock exerted on the vehicle. Parts of the upper wall 4$a$ and the lower wall 4$b$ corresponding to joining parts of the bumper beam 10 attached to the front end parts of the frames 1$a$ and 1$b$ are inclined to the front wall 4$c$ to form inclined parts 5.

More concretely, in a middle part of the bumper beam 10, the reinforcing beam 4 having a substantially U-shaped cross section is in close contact with the front and the rear wall of the bumper beam body 3 having a closed cross section as shown in FIG. 1B; that is, the front wall 4$c$ of the reinforcing beam 4 is in contact with the front wall of the bumper beam body 3, and flanges 4$d$ extended from the rear edges of the upper wall 4$a$ and the lower wall 4$b$ of the reinforcing beam 4 are in contact with the rear wall of the bumper beam body 3.

In each of the joining parts of the bumper beam 10 attached to the end parts of the frames 1$a$ and 1$b$, the flanges 4$d$ extended from the rear edges of the upper wall 4$a$ and the lower wall 4$b$ of the reinforcing beam 4 having a substantially U-shaped cross section are in contact with the rear wall of the bumper beam body 3, and the front wall 4$c$ of the reinforcing beam 4 is spaced from the front wall of the bumper beam body 3 as shown in FIG. 1C. In each of parts of the reinforcing beam 4 corresponding to the joining parts of the bumper beam 10, the upper wall 4a and the lower wall 4b of the reinforcing beam 4 have the inclined parts 5, respectively, so that those parts of the reinforcing beam 4 yield relatively easily to a longitudinal shock. Thus, the strength of the parts of the reinforcing beam 4 corresponding to the joining parts of the bumper beam 10 attached to the end parts of the frames 1a and 1b is lower than that of other parts of the same so that the joining parts may be deformed by a compressive force exceeding a predetermined level.

In the first embodiment, since the strength of the parts of the reinforcing beam 4 corresponding to the joining parts of the bumper beam 10 attached to the end parts of the frames 1a and 1b is lower than that of other parts of the same so that the joining parts may be deformed by a compressive force exceeding a predetermined level, the bumper beam 10 (the bumper beam body 3 or the reinforcing beam 4) has a strength sufficient to withstand a compressive force below the predetermined level that is exerted thereto by a slight collision, the bumper beam 10 is not damaged by such a low compressive force and hence the bumper beam 10 does not need to be changed frequently. When a compressive force exceeding the predetermined level is exerted on the bumper beam 10 by a high-speed collision, the inclined parts 5 of the upper wall 4a and the lower wall 4b in the parts of the reinforcing beam 4 corresponding to the joining parts of the bumper beam 10 attached to the end parts of the frames 1a and 1b buckle and collapse in an early stage of the high-speed collision to limit a maximum impact load to a low level and to absorb collision energy efficiently so that reduced collision energy may be exerted on the frames 1a and 1b of the body of the vehicle.

In the first embodiment, since the parts of the front wall of the reinforcing beam 4 corresponding to the joining parts of the bumper beam 10 attached to the frames 1a and 1b are spaced from the front wall of the bumper beam body 3, the initial collapsing of the bumper beam body 3 is promoted in a high-speed collision that exerts a compressive force exceeding the predetermined level on the joining parts of the bumper beam 10.

In the bumper beam 10 in the first embodiment having the bumper beam body 3 and the reinforcing beam 4, only the distribution of strength in the reinforcing beam 4 is adjusted for collapsing mode adjustment. Therefore, the bumper beam body 3 does not need to be formed in a complicated shape and may be formed in a simple shape.

In the first embodiment, the inclined parts 5 inclined to the front wall 4c of the reinforcing beam 4 are formed in parts of the upper wall 4a and the lower wall 4b of the reinforcing beam 4 corresponding to the joining parts of the bumper beam 10 attached to the front end parts of the frames 1a and 1b to reduce the strength of the parts of the reinforcing beam 4 corresponding to the joining parts of the bumper beam 10. Thus, the adjustment of the distribution of strength in the reinforcing beam 4 can be achieved only through the variation of the sectional shape of the reinforcing beam 4 and hence the reinforcing beam 4 can be easily manufactured without requiring boring work or cutting work.

In the first embodiment, the inclined parts 5 are formed in the upper wall 4a and the lower wall 4b of the reinforcing beam 4 so as to merge into the front wall 4c. Inclined parts having, for example, a V-shaped cross section may be formed in respective middle parts of the upper wall 4a and the lower wall 4b instead of the inclined parts 5.

Second Embodiment

A bumper beam 10 in a second embodiment of the present invention will be described with reference to FIGS. 2A, 2B and 2C, in which parts like or corresponding to those of the first embodiment will be denoted by the same reference characters and the description thereof will be omitted. The bumper beam 10 in the second embodiment is substantially the same in construction as the bumper beam 10 in the first embodiment, except that the former has a reinforcing beam 4 provided with holes (openings) instead of inclined parts.

Referring to FIGS. 2A, 2B and 2C, the bumper beam 10 includes a bumper beam body 3 and the reinforcing beam 4. The reinforcing beam 4 is extended in and along the bumper beam body 3. The reinforcing beam 4 has an upper wall 4a, a lower wall 4b and a front wall 4c formed integrally with the upper wall 4a and the lower wall 4b. The front wall 4c receives a longitudinal shock exerted on the vehicle. Parts of the upper wall 4a and the lower wall 4b corresponding to joining parts of the bumper beam 10 attached to the end parts of frames 1a and 1b are provided with holes 6 (openings) in their middle parts.

The bumper beam 10 (the bumper beam body 3 or the reinforcing beam 4) in the second embodiment, similarly to that in the first embodiment, has a strength sufficient to withstand a compressive force below a predetermined level that is exerted thereto by a slight collision, the bumper beam 10 is not damaged by such a low compressive force and hence the bumper beam 10 does not need to be changed frequently. When a compressive force exceeding the predetermined level is exerted on the bumper beam 10 by a high-speed collision, the parts provided with the holes 6 of the upper wall 4a and the lower wall 4b of the reinforcing beam 4 corresponding to the joining parts of the bumper beam 10 attached to the end parts of the frames 1a and 1b buckle and collapse in an early stage of the high-speed collision to limit a maximum impact load to a low level and to absorb collision energy efficiently so that reduced collision energy may be exerted on the frames 1a and 1b of the body of the vehicle.

In the second embodiment, since the parts of the upper wall 4a and the lower wall 4b of the reinforcing beam 4 corresponding to the joining parts of the bumper beam 10 attached to the frames 1a and 1b are provided with the holes 6 to reduce the strength of the parts of the reinforcing beam 4 corresponding to the joining parts of the bumper beam 10. Thus, the reinforcing beam 4 may be formed in a simple sectional shape and can be easily manufactured. Particularly, the reinforcing beam 4 provided with the holes 6 in the middle parts of the parts of the upper wall 4a and the lower wall 4b thereof can be easily manufactured by, for example, bending a plate even though boring work is necessary.

Third Embodiment

A bumper beam 10 in a third embodiment of the present invention will be described with reference to FIGS. 3A, 3B and 3C, in which parts like or corresponding to those of the first embodiment will be denoted by the same reference characters and the description thereof will be omitted. The bumper beam 10 in the third embodiment is substantially the same in construction as the bumper beam 10 in the first embodiment, except that the former has a reinforcing beam 4 provided with inclined parts and holes (openings).

Figure 3B:
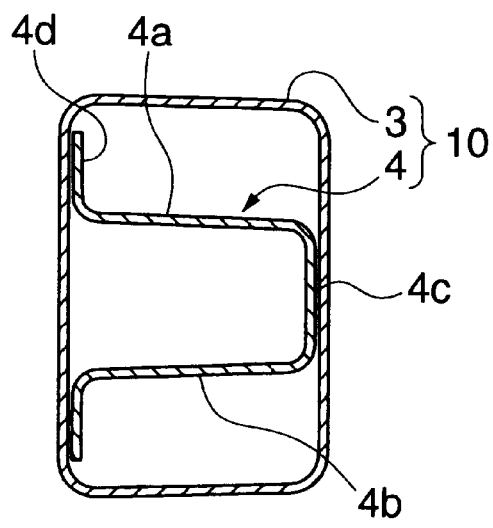
Figure 3C:
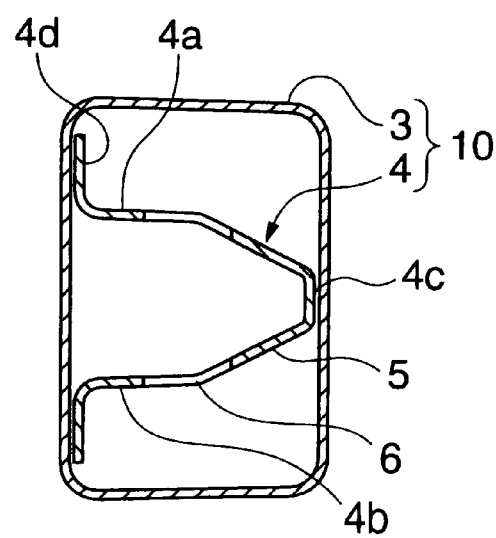

Referring to FIGS. 3A, 3B and 3C, the bumper beam 10 includes a bumper beam body 3 and the reinforcing beam 4. The reinforcing beam 4 is extended in and along the bumper beam body 3. The reinforcing beam 4 has an upper wall 4a, a lower wall 4b and a front wall 4c formed integrally with the upper wall 4a and the lower wall 4b. The front wall 4c receives a longitudinal shock exerted on the vehicle. Parts of the upper wall 4a and the lower wall 4b corresponding to joining parts of the bumper beam 10 attached to the front end parts of the frames 1a and 1b are inclined to the front wall 4c to form inclined parts 5, and holes 6 (openings) are formed in the inclined parts 5.

The bumper beam 10 (the bumper beam body 3 or the reinforcing beam 4) in the third embodiment, similarly to those in the first and the second embodiment, has a strength sufficient to withstand a compressive force below a predetermined level that is exerted thereto by a slight collision, the bumper beam 10 is not damaged by such a low compressive force and hence the bumper beam 10 does not need to be changed frequently. When a compressive force exceeding the predetermined level is exerted on the bumper beam 10 by a high-speed collision, the parts provided with the inclined parts 5 and the holes 6 of the upper wall 4a and the lower wall 4b of the reinforcing beam 4 corresponding to the joining parts of the bumper beam 10 attached to the end parts of the frames 1a and 1b buckle and collapse in an early stage of the high-speed collision to limit a maximum impact load to a low level and to absorb collision energy efficiently so that reduced collision energy may be exerted on the frames 1a and 1b of the body of the vehicle.

Although the holes 6 are formed in the inclined parts 5 in the third embodiment, the holes 6 may be formed in parts other than the inclined parts 5.

Fourth Embodiment

A bumper beam 10 in a fourth embodiment of the present invention will be described with reference to FIGS. 4A, 4B and 4C, in which parts like or corresponding to those of the first embodiment will be denoted by the same reference characters and the description thereof will be omitted. The bumper beam 10 in the fourth embodiment is substantially the same in construction as the bumper beam 10 in the first embodiment shown in FIGS. 1A, 1B and 1C, except that the former has a reinforcing beam 4 provided with recesses (openings) instead of inclined parts.

Figure 4A:
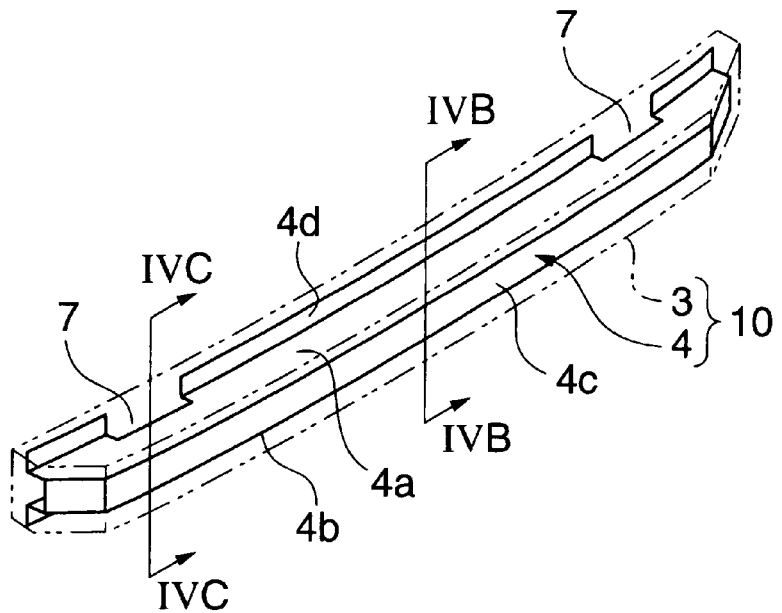
Figures 4B, 4C:
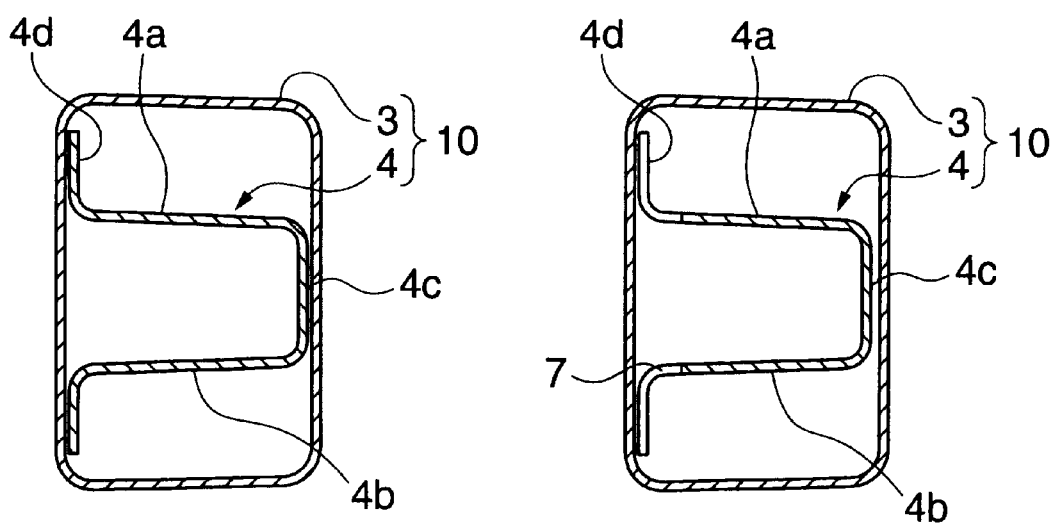

Referring to FIGS. 4A, 4B and 4C, the bumper beam 10 includes a bumper beam body 3 and a reinforcing beam 4. The reinforcing beam 4 is extended in and along the bumper beam body 3. The reinforcing beam 4 has an upper wall 4a, a lower wall 4b and a front wall 4c formed integrally with the upper wall 4a and the lower wall 4b. The front wall 4c receives a longitudinal shock exerted on the vehicle. Parts of the upper wall 4a and the lower wall 4b corresponding to joining parts of the bumper beam 10 attached to the end parts of frames 1a and 1b are provided with recesses 7 (openings) in their rear edges (flanges 4d).

The bumper beam 10 (the bumper beam body 3 or the reinforcing beam 4) in the fourth embodiment, similarly to that in the first embodiment, has a strength sufficient to withstand a compressive force below a predetermined level that is exerted thereto by a slight collision, the bumper beam 10 is not damaged by such a low compressive force and hence the bumper beam 10 does not need to be changed frequently. When a compressive force exceeding the predetermined level is exerted on the bumper beam 10 by a high-speed collision, the parts provided with the recesses 7 of the upper wall 4a and the lower wall 4b of the reinforcing beam 4 corresponding to the joining parts of the bumper beam 10 attached to the end parts of the frames 1a and 1b buckle and collapse in an early stage of the high-speed collision to limit a maximum impact load to a low level and to absorb collision energy efficiently so that reduced collision energy may be exerted on the frames 1a and 1b of the body of the vehicle.

In the fourth embodiment, since the parts of the upper wall 4a and the lower wall 4b of the reinforcing beam 4 corresponding to the joining parts of the bumper beam 10 attached to the frames 1a and 1b are provided with the recesses 7 to reduce the strength of the parts of the reinforcing beam 4 corresponding to the joining parts of the bumper beam 10. Thus, the reinforcing beam 4 may be formed in a simple sectional shape and can be easily manufactured. Particularly, since the reinforcing beam 4 is provided with the recesses 7 in the parts of the rear edges of the upper wall 4a and the lower wall 4b thereof, the bumper beam 3 or the reinforcing beam 4 can be easily manufactured by, for example, bending a plate even though cutting work for cutting parts of the edges of a plate is necessary. The cutting work for cutting edges of a plate is simpler than the boring work.

The features of the first, the second and the fourth embodiment, namely, the inclined parts 5, the holes 6 and the recesses 7, may be used in combination, the shapes and the numbers of the inclined parts, the holes and the recesses may be optionally determined and structures associated with the inclined parts, the holes and the recesses may be optionally designed to enable further exact collapsing mode adjustment.

Although only the reinforcing beam is provided with the inclined parts 5, the holes 6 and/or the recesses 7 in the first to the fourth embodiment, only the bumper beam body 3 or both the bumper beam body 3 and the reinforcing beam 4 may be provided with inclined parts, holes and/or recesses.

Figure 6A:
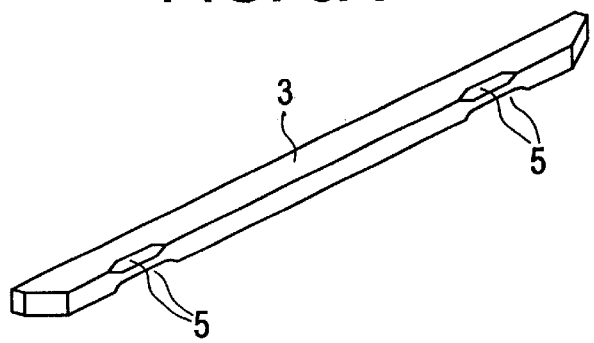
FIGS. 6A, 6B, 6C, 6D, and 6E are views of a bumper beam body.
Figure 6B:
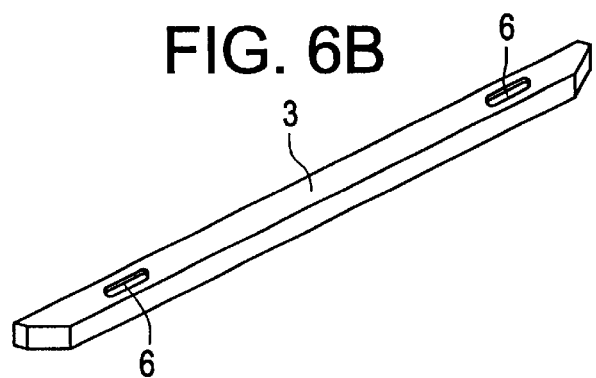
Figure 6D:
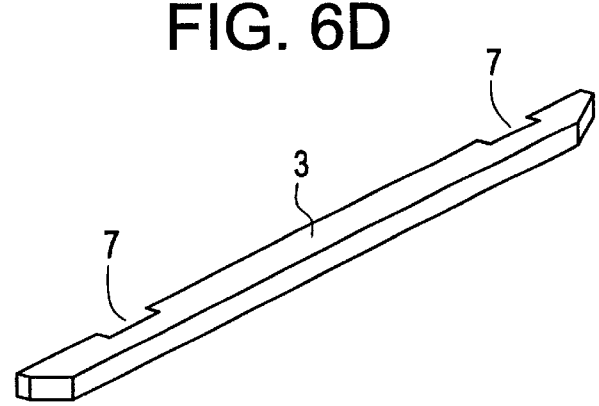
Figure 6C:
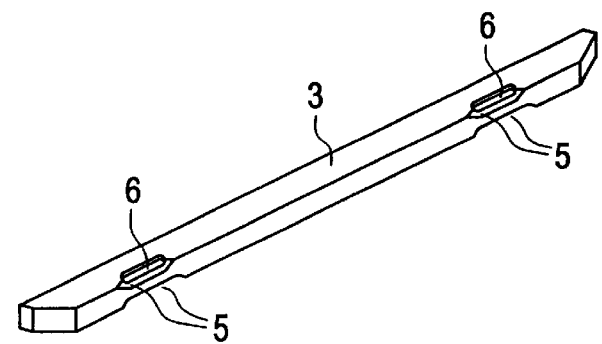
Figure 6E:
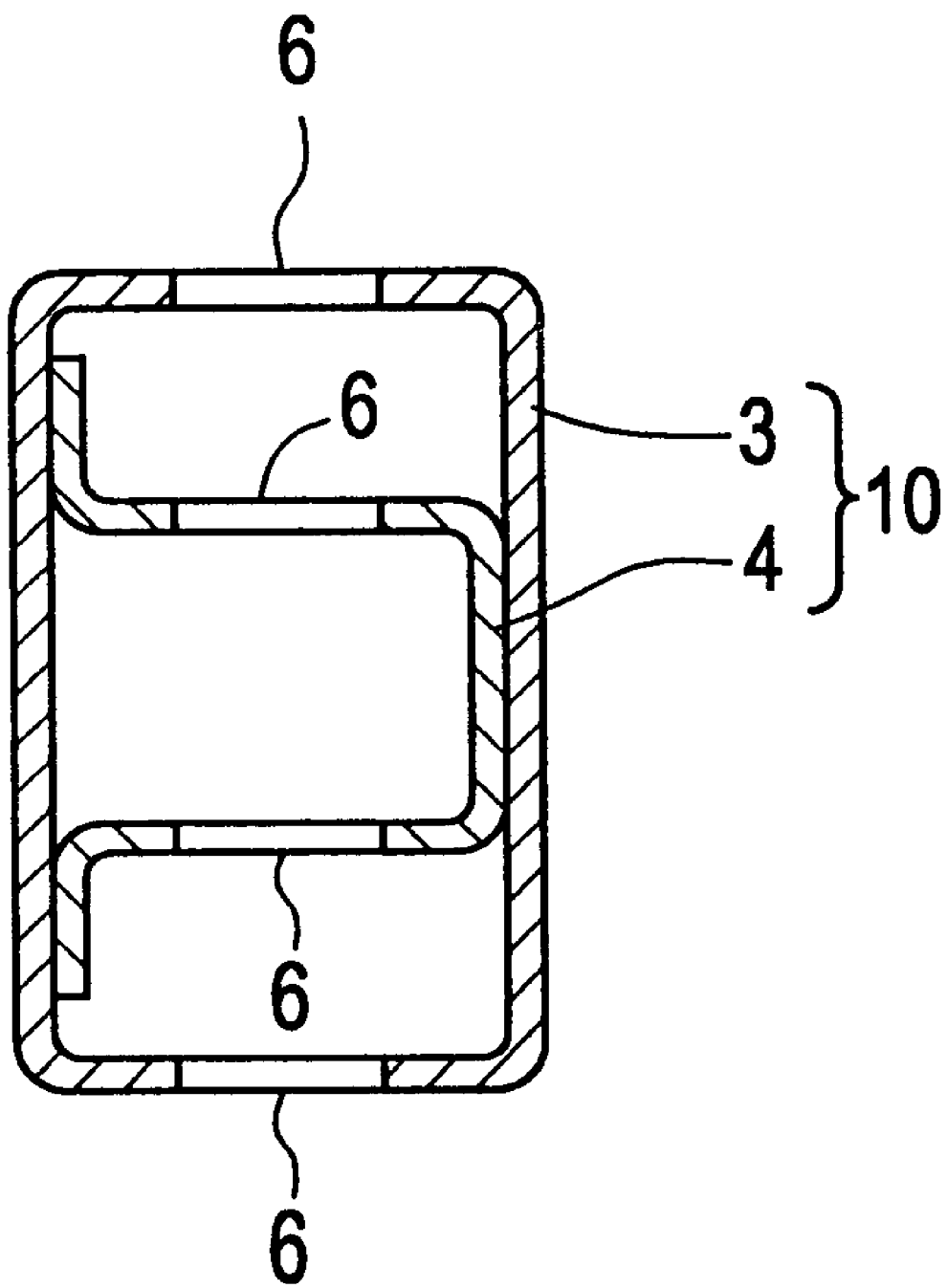

FIG. 6A shows the bumper beam body 3 corresponding to the first embodiment, wherein the bumper beam body 3 is provided with the inclined parts 5. FIG. 6B shows the bumper beam body 3 corresponding to the second embodiment, wherein the bumper beam body is provided with holes 6. FIG. 6C shows the bumper beam body 3 corresponding to the third embodiment, wherein the bumper beam body 3 is provided with the inclined parts and holes. FIG. 6D shows the bumper beam body 3 corresponding to the fourth embodiment, wherein the bumper beam body 3 has recess 7 (openings) in the rear edge thereof. Furthermore, FIG. 6E shows the bumper beam body corresponding to FIG. 2C, wherein both the bumper beam body 3 and the reinforcing beam 4 are provided with holes 6.

Although the first to the fourth embodiment employ the inclined parts 5, the holes 6 and/or the recesses 7 to reduce the strength of the parts of the bumper beam body 3 or the reinforcing beam 4 corresponding to the joining parts of the bumper beam 10 attached to the end parts of the frames 1a and 1b, parts of the bumper beam body 3 or the reinforcing beam 4 may be formed in a wavy shape or may be formed of a material different from that forming other parts for the same purpose.

Although each of the bumper beams 10 in the first to the fourth embodiment has the bumper beam body 3 and the reinforcing beam 4, the present invention is applicable also to a bumper beam not having any reinforcing beam.

Although the preferred embodiments of the invention have been described, the shapes of the bumper beam body 3 and the reinforcing beam 4, the positional relation of the reinforcing beam 4 with the bumper beam body 3, and the manner of attachment of the bumper beam body 3 to the end parts of the frames 1a and 1b may be selectively determined without departing from the scope of the present invention.

What is claimed is:

1. A bumper beam to be disposed on a front or rear end part of a vehicle, comprising:
   a bumper beam body attached to an end part of a longitudinal frame of the vehicle so as to extend laterally; and
   a reinforcing beam extended in and along the bumper beam body;

wherein a part of the bumper beam body, around a joining part attached to the end part of the longitudinal frame has a strength lower than that of an other part of the bumper beam body, or wherein a part of the reinforcing beam around a joining part attached to the end part of the longitudinal frame has a strength lower than that of an other part of the reinforcing beam, said other part being located at a different position from the joining part with respect to an extending direction of the bumper beam body or the reinforcing beam, so that the joining part may be deformed by a compressive force exceeding a predetermined level.

2. A bumper beam disposed on a longitudinal frame of a vehicle, comprising:

a joining part of said bumper beam to be attached to an end portion of said longitudinal frame for fastening said bumper beam on said vehicle; and a part of said bumper beam corresponding to said joining part, having a strength lower than that of an other part of said bumper beam, said other part being located at different positions from the joining part with respect to an extending direction of said bumper beam, so as to deform said joining part by a compressive force exceeding a predetermined level.

3. The bumper beam according to claim 2, wherein said bumper beam includes a bumper beam body having said joining part and a reinforcing beam extended in and along the bumper beam body, said part is formed in said bumper beam body.

4. The bumper beam according to claim 3, wherein said part forms an inclined part inclined toward a front wall of said bumper beam body.

5. The bumper beam according to claim 3, wherein said part has an opening therein.

6. The bumper beam according to claim 2, wherein said bumper beam includes a bumper beam body having said joining part and a reinforcing beam extended in and along the bumper beam body.

7. A bumper beam to be disposed on a front or rear end part of a vehicle, comprising:

a bumper beam body attached to an end part of a longitudinal frame of a body of said vehicle so as to extend laterally; and a reinforcing beam extended in and along the bumper beam body;

wherein a part of the bumper beam body, around a joining part attached to the end part of the longitudinal frame has a strength lower than that of an other part of the bumper beam body, or wherein a part of the reinforcing beam around a joining part attached to the end part of the longitudinal frame has a strength lower than that of an other part of the reinforcing beam, said other part being located at a different position from the joining part with respect to an extending direction of the bumper beam body or the reinforcing beam, so that the joining part may be deformed by a compressive force exceeding a predetermined level, said reinforcing beam including a lateral upper wall, a lateral lower wall and a front wall formed integrally with the upper and the lower wall to receive a longitudinal shock exerted on the vehicle, and a part of at least either the upper wall or the lower wall around the joining part is an inclined part inclined to the front wall.

8. The bumper beam according to claim 2, wherein a part of the front wall of the reinforcing beam around the joining part is spaced from the bumper beam body.

9. A bumper beam to be disposed on a front or rear end part of a vehicle, comprising:

a bumper beam body attached to an end part of a longitudinal frame of a body of said vehicle so as to extend laterally; and a reinforcing beam extended in and along the bumper beam body;

wherein a part of the bumper beam body, around a joining part attached to the end part of the longitudinal frame has a strength lower than that of an other part of the bumper beam body, or wherein a part of the reinforcing beam around a joining part attached to the end part of the longitudinal frame has a strength lower than that of an other part of the reinforcing beam, so that the joining part may be deformed by a compressive force exceeding a predetermined level, said reinforcing beam including a lateral upper wall, a lateral lower wall and a front wall formed integrally with the upper and the lower wall to receive a longitudinal shock exerted on the vehicle, and a part of at least either the upper wall or the lower wall around the joining part is an inclined part inclined to the front wall.

10. The bumper beam according to claim 9, wherein the opening is a hole formed in a middle part of the upper or the lower wall.

11. The bumper beam according to claim 10, wherein a part of the front wall of the reinforcing beam around the joining part is spaced from the bumper beam body.

12. The bumper beam according to claim 10, wherein the opening is a hole formed in a middle part of the upper or the lower wall.

13. The bumper beam according to claim 10, wherein the opening is a recess formed in an edge of the upper or the lower wall, said edge being positioned opposite to the front wall.

14. The bumper beam according to claim 9, wherein the opening is a recess formed in an edge of the upper or the lower wall, said edge being positioned opposite to the front wall.

15. A bumper beam to be disposed on a front or rear end part of a vehicle, comprising:

a bumper beam body attached to an end part of a longitudinal frame of a body of said vehicle so as to extend laterally;

a reinforcing beam extended in and along the bumper beam body;

wherein a part of the bumper beam body, around a joining part attached to the end part of the longitudinal frame has a strength lower than that of an other part of the bumper beam body, or wherein a part of the reinforcing beam around a joining part attached to the end part of the longitudinal frame has a strength lower than that of an other part of the reinforcing beam, so that the joining part may be deformed by a compressive force exceeding a predetermined level;

said reinforcing beam including a lateral upper wall, a lateral lower wall and a front wall formed integrally with the upper and the lower wall to receive a longitudinal shock exerted on the vehicle, and an inclined part inclined to the front wall and an opening formed in a part of at least either the upper wall or the lower wall around the joining part.

16. A bumper beam to be disposed on a front or rear end part of a vehicle, comprising:

a bumper beam body attached to an end part of a longitudinal frame of a body of said vehicle so as to extend laterally; and a reinforcing beam extended in and a long the bumper beam body;

wherein a part of the bumper beam body, around a joining part attached to the end part of the longitudinal frame has a strength lower than that of an other part of the bumper beam body, or wherein a part of the reinforcing beam around a joining part attached to the end part of the longitudinal frame has a strength lower than that of an other part of the reinforcing beam so that the joining part may be deformed by a compressive force exceeding a predetermined level;

said reinforcing beam including a lateral upper wall, a lateral lower wall, a front wall formed integrally with the upper and the lower wall to receive a longitudinal shock exerted on the vehicle, and an opening formed in a part of at least either the upper wall or the lower wall around the joining part; and wherein a part of the front wall of the reinforcing beam around the joining part is spaced from the bumper beam body.

17. A bumper beam disposed on a longitudinal frame of said vehicle, comprising:

a joining part of said bumper beam to be attached to an end portion of said longitudinal frame for fastening said bumper beam on said vehicle; and a part of said bumper beam corresponding to said joining part, having a strength lower than that of an other part of said bumper beam, said other part being located at different positions from the joining part with respect to an extending direction of said bumper beam, so as to deform said joining part by a compressive force exceeding a predetermined level;

said bumper beam including a bumper beam body having said joining part and a reinforcing beam extended in and along the bumper beam body;

said part being formed in said bumper beam body, and having a recess therein.

18. A bumper beam disposed on a longitudinal frame of a vehicle, comprising:

a joining part of said bumper beam to be attached to an end portion of said longitudinal frame for fastening said bumper beam on said vehicle;

a part of said bumper beam corresponding to said joining part, having a strength lower than that of another part of said bumper beam so as to deform said joining part by a compressive force exceeding a predetermined level;

said bumper beam including a bumper beam body having said joining part and a reinforcing beam extended in and along the bumper beam body, said part being formed in said bumper beam body, and forming an inclined part inclined toward a front wall of said bumper beam body, and having an opening therein.

* * * * *